(12) United States Patent
Morozov et al.

(10) Patent No.: US 8,182,600 B2
(45) Date of Patent: May 22, 2012

(54) ELECTRODE FOR ELECTROCHEMICAL PROCESSES AND METHOD FOR PRODUCING THE SAME

(75) Inventors: Alexander Morozov, Moscow (RU); Achille De Battisti, Ferrara (IT); Sergio Ferro, Ferrara (IT); Gian Nicola Martelli, Vimodrone (IT)

(73) Assignee: Industrie De Nora S.p.A., Milan (IT)

( * ) Notice: Subject to any disclaimer, the term of this patent is extended or adjusted under 35 U.S.C. 154(b) by 88 days.

(21) Appl. No.: 12/655,424

(22) Filed: Dec. 30, 2009

(65) Prior Publication Data

US 2010/0126851 A1   May 27, 2010

Related U.S. Application Data

(62) Division of application No. 10/563,852, filed as application No. PCT/EP2004/008397 on Jul. 27, 2004, now Pat. No. 7,695,755.

(30) Foreign Application Priority Data

Jul. 28, 2003   (IT) .............................. MI2003A1543

(51) Int. Cl.
*C23C 16/40*   (2006.01)
(52) U.S. Cl. .................................. 106/287.19
(58) Field of Classification Search .......... None
See application file for complete search history.

(56) References Cited

U.S. PATENT DOCUMENTS

| 4,873,352 | A  | * | 10/1989 | Kobashi et al. | 556/105 |
| 5,736,497 | A  | * | 4/1998  | Steiner        | 510/303 |
| 5,855,612 | A  | * | 1/1999  | Ohthuki et al. | 424/423 |
| 2003/0073150 | A1 | * | 4/2003 | Woerner et al. | 435/7.92 |

FOREIGN PATENT DOCUMENTS

EP   376704 A1 * 7/1990

OTHER PUBLICATIONS

Muranol et al, properties of stannic oxide thin films produced from the sncl4-h2o and sncl4-h2o2 reaction systems, 1976, thin solid films, vol. 48, issue 3, pp. 309-318.*

Ohsuki et al, bioactivity of titanium treated with hydrogen peroxide solutions containing metal chlorides, 1997, journal of biomedical materiasl research, vol. 35, pp. 39-47.*

* cited by examiner

*Primary Examiner* — Melvin Mayes
*Assistant Examiner* — Stefanie Cohen
(74) *Attorney, Agent, or Firm* — Eschweiler & Associates, LLC

(57) ABSTRACT

An anode provided with an electrocatalytic coating comprising tin, preferably tetravalent and in form of mixed oxide, prepared by the method for the manufacturing of an electrode, comprising applying a solution of a precursor for the pyrolytic formation of a tin-containing coating to a substrate of a valve metal, followed by the execution of thermal treatment, wherein the precursor solution comprises stannic hydroxychloride and a method of preparing the same.

4 Claims, No Drawings

ELECTRODE FOR ELECTROCHEMICAL PROCESSES AND METHOD FOR PRODUCING THE SAME

This application is a division of U.S. patent application Ser. No. 10/563,852 filed Jan. 5, 2006, now U.S. Pat. No. 7,695,755 which is a 371 of PCT/EP2004/008397 filed Jul. 27, 2004.

The use of metallic electrodes with electrocatalytic coating based on tin oxides, and in particular tin dioxide optionally mixed with other components, is known in the art. In particular, catalytic coatings containing tin dioxide mixed with noble metals and/or oxides thereof and/or oxides of metals capable of imparting corrosion protection are commonly employed for anodes deputed to oxygen evolution, for instance in electrometallurgical processes or relative to water treatment (tap water and waste water treatment). Oxygen evolving electrodes typical of the prior art are constructed starting from a valve metal substrate, preferably of titanium or titanium alloy, optionally provided with a protective ceramic pre-layer, whereon a catalytic coating is applied containing at least one oxide of a metal capable of imparting corrosion protection (preferably tin or tantalum) and at least one noble metal (preferably iridium), optionally in oxide form. The invention disclosed hereafter is directed to improve the performances and the reproducibility of all tin-containing electrocatalytic coatings, for instance of ruthenium-containing coatings directed to chlorine evolution, but is particularly suited to obtaining oxygen-evolving anodes containing tin and iridium oxide mixtures.

The coatings of the prior art based on tin oxides and on noble metals are prepared starting from tetravalent tin precursors (in particular $SnCl_4$) mixed to equivalent precursors of the noble metal in aqueous solution. U.S. Pat. No. 3,710,724 discloses for instance the preparation of anodic coatings for oxygen evolution obtained from a mixture of $SnCl_4$ and $H_2IrCl_6$, and of anodic coatings for chlorine evolution obtained from a mixture of $SnCl_4$ and $RuOHCl_3$. These mixtures are characterised by high reduction potentials (about 0.8 V NHE), at which tin can stably exist only in tetravalent form. Notwithstanding their wide diffusion, the precursor solutions thus obtained present remarkable problems as concerns their industrial application, so much as limiting the use of this type of electrodes. The main inconvenient, which negatively reflects on the performances and on the reproducibility of the preparation processes, is given by the tin tetrachloride high volatility, which brings about uncontrolled losses thereof during the various drying steps or, in general, during the various thermal treatments required to produce the electrodes. The precursor volatility among other things prevents obtaining oxide coatings of stoichiometric composition, and therefore dense ceramic layers of well-defined crystalline structure. The industrial lifetimes of anodes with coatings comprising tin dioxide, prepared according to formally identical procedures, may hence differ one from the other by even two orders of magnitude. Normally the yield of deposition of $SnO_2$ a starting from the $SnCl_4$ precursor does not exceed 15-20%, as evidenced in J. Appl. Electrochem. 21 (1991), 136. In the same article it is specified that the yield can increase up to 30% making use of alcohol or 2,4 pentandione (acetylacetone)-based solutions; it is evident however that an improvement by this order of magnitude does not justify, from an economic standpoint, the use of this type of solvents in an industrial process, especially for the additional costs of disposal. A different measure known in the art (J. Electrochem. Soc. 143 (1996), 203) allows the reduction of tin tetrachloride volatility by means of a technique providing a pyrolysis of the solution in a nebulised phase. An aerosol of the precursor solution is hence thermally decomposed on the pre-heated surface of a titanium substrate at 400° C.; smoother, denser and more adherent coatings are thus obtained, nevertheless not yet characterised by compositions of the mixed oxides corresponding to the starting stoichiometry. In J. Appl. Electrochem. 21 (1991), 136 it is described how an application of $RuOHCl_3+SnCl_4$ in a Ru:Sn molar ratio of 1:2 leads to a $RuO_2$ content in the coating inevitably higher than 80%, since a consistent portion of the tin precursor is volatilised during the deposition; it is apparent to an expert in the field how this entails a downright insufficient reproducibility and reliability in the methodology of preparation. To increase the tin deposition yield, the use of precursors such as tetrabutyltin or $(C_{16}H_{30}O_4)_2SnO$ in anhydrous organic solvents (see J. Electrochem. Soc. 143 (1996), 203) was also suggested, as well as that of $(C_5H_{11}O)_2SnCl_2$, as disclosed in the Soviet Patent SU314344. In the latter document, the preparation of tin diamyl precursor $(C_5H_{11}O)_2SnCl_2$ by boiling $SnCl_4$ with a dephlegmator in the presence of n-amyl alcohol in aqueous solution was described. Also the use of tin organic salts presents however some small drawbacks, the most evident of which consists again of the use of solvents, particularly disadvantageous in terms of costs of treatment and disposal in the case of anhydrous organic solvents. Moreover, tin organic salts are very sensible to moisture, and give easily rise to scarcely coherent and compact oxide layers. Finally, said organic precursors may provoke, during the pyrolysis step, the partial reduction of the coexisting noble metal oxide, with negative consequences in terms of chemical stability and catalytic activity.

It is a first object of the present invention to provide a tin-containing anodic coating overcoming the limitations of the prior art.

It is a further object of the present invention to provide a method of preparation of tin-containing anodic coatings starting from precursors overcoming the limitations of the prior art.

Under a first aspect, the invention consists of an electrode provided with an anodic coating containing tin, in particular tin dioxide, characterised by high density and compactness and by controlled chemical composition, prepared from solutions of optionally non-stoichiometric hydroxychlorides, optionally having organic substituents.

Under a second aspect, the invention consists of an innovative precursor for electrocatalytic coatings containing tin, in particular tin dioxide, and of a method for the manufacturing thereof.

Under a further aspect, the invention consists of a method for the manufacturing of electrocatalytic coatings containing tin, in particular tin dioxide, starting from tetravalent stannic hydroxychlorides in aqueous solution, applied on a matrix of titanium or other valve metal and thermally converted. Tetravalent tin hydroxychlorides are complexes with a variable composition of the inner complexation sphere of the cation. The structure of this family's progenitor can be expressed by the general formula $SnO(H_2O)_nCl_2$ with n comprised between 1 and 4. The chemical nature of these compounds can be assimilated to the one of HCl peptised β-stannic acids. The progenitor $SnO(H_2O)_nCl_2$ is characterised, in its stoichiometric form, by a Cl:Sn ratio equal to 2; it is however possible to alter this ratio, and in particular to decrease it, isolating non-stoichiometric forms of this type of compound characterised by a chlorine defect, for instance according to the general formula $Sn(OH)_{2+x}Cl_{2-x} \cdot nH_2O$. More advantageously, the chloride anion can however be partially replaced with other anions or groups, forming hydroxychlorides with a Cl:Sn lower than 2, which can be expressed by the general formula $SnO(H_2O)_nR_{2-x}Cl_x$. The thermal decomposition of β-stannic acids is characterised by an initial loss of water adsorbed by physical bonds (until 200° C.) followed by the progressive release of hydrogen bridge-bonded chemisorbed water. The $SnO_2$ coating maintains a significant degree of hydroxylation even at temperatures above 400° C., which indicates a particular thermal stability of the surface —OH groups, which have ion-exchange properties and are responsible for many of the electrocatalytic features of $SnO_2$ coatings. The inventors have found out that the preparation of tin dioxide coatings starting from hydroxychlorides leads to particularly high tin deposition yields; moreover, the properties of stability, electrocatalytic activity and reproducibility of coatings obtained from hydroxychlorides are very high. In accordance with the present invention, the preparation of catalytic coatings comprising tin dioxide starting from solutions comprising Sn (IV) hydroxychlorides with a Cl:Sn ratio lower than 2, preferably of general formula $SnO(H_2O)_nR_{2-x}Cl_x$, is particularly advantageous. According to a particular embodiment of the present invention the preparation of catalytic coatings comprising tin dioxide starting from solutions comprising Sn (IV) hydroxychlorides with a Cl:Sn ratio comprised between 1 and 1.9 is particularly advantageous. According to a still more preferred embodiment, said Cl:Sn ratio comprised between 1 and 1.9 is advantageously obtained by using hydroxychlorides of general formula $SnO(H_2O)_nR_{2-x}Cl_x$ wherein R is an acetate group ($CH_3COO$—). According to a preferred embodiment, the precursor solution comprising Sn (IV) hydroxychlorides further comprises a precursor of an oxide of a noble metal, preferably iridium or ruthenium. The pyrolysis of precursor solutions according to the invention lead to the formation of coatings containing tin dioxide with yields higher than 80%, which in the most favourable cases reach a value of about 95%. Without wishing the present invention to be bound in any way to any particular theory, it can be presumed that the considerations reported hereafter may help to better understand its functioning.

The pyrolysis process of the precursor of the invention may include dehydration, hydrolysis and disproportioning reactions, according to the following scheme, referred for the sake of simplicity to the progenitor $SnO(H_2O)_nCl_2$:

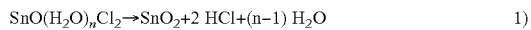
$$SnO(H_2O)_nCl_2 \rightarrow SnO_2 + 2\ HCl + (n-1)\ H_2O \quad 1)$$

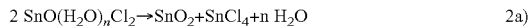
$$2\ SnO(H_2O)_nCl_2 \rightarrow SnO_2 + SnCl_4 + n\ H_2O \quad 2a)$$

$$SnCl_4 + 2\ H_2O \rightarrow SnO_2 + 4\ HCl \quad 2b)$$

Tin tetrachloride formed in the reaction 2a, by virtue of what said above, tends to volatilise in part before being able to convert to oxide according to the reaction 2b. The $SnO(H_2O)_nCl_2$ precursor can therefore decompose according to two alternative competing mechanisms: of these, the former (reaction 1) does not involve the highly volatile species $SnCl_4$, thereby ensuring a tin deposition yield at any rate higher than the prior art precursor. By choosing a hydroxychloride different from the progenitor $SnO(H_2O)_nCl_2$, in particular with a lower chlorine content, tin tetrachloride formation will result more inhibited, leading to still higher deposition yields. According to a preferred embodiment of the present invention, the selected hydroxychloride is a tin (IV) hydroxyacetochloride (HAC) expressed by the formula $SnO(H_2O)_nAc_{2-x}Cl_x$ wherein Ac indicates the acetic group ($CH_3COO$—) and x can theoretically be comprised between 0 and 2, preferably between 1 and 1.9. The existence of tin (IV) hydroxyacetochlorides has not been disclosed in the literature up to now, nor there was any type of indication about their possible stability in aqueous phase, alone or in the presence of noble metal precursors such as ruthenium or iridium chlorides. The inventors have found out a simple and effective route for their synthesis, verifying such characteristics. The mere existence of a Sn (IV) solution containing acetate ions is surprising per se, since it is known in the art that tetravalent tin acetate cannot exist in aqueous solution. Most likely, in the case of the present invention, the acetate ions of the solution are part of the inner coordination sphere of a Sn (IV) complex. The methods of preparation of these solutions and the utilisation thereof for the preparation of electrodes are described in the following examples, whose purpose is purely illustrative and not limiting the present invention.

EXAMPLE 1

For the preparation of 1 liter of stannic hydroxychloride $SnO(H_2O)_nCl_2$ aqueous solution, 372.3 g of $SnCl_2.2H_2O$ were dissolved in 500 ml of water. 170 ml of 30% hydrogen peroxide were gradually added to the solution, controlling the temperature with a thermostatic bath, until detecting the cease of heat emission and the reaching of a potential comprised between 0.5 and 0.6 V with respect to a saturated silver chloride reference electrode (SSCE). The volume of the mixture was then brought to 1 liter with water. A stable and colourless stannic hydroxychloride solution was then obtained, 1.65 M in Sn (IV) and with a density of 1.31 g/l. It was verified by elementary analysis that the Cl:Sn ratio was exactly 2, as expected. The yield in $SnO_2$ obtainable by pyrolysis of this solution was determined by evaporation of a weighted quantity and subsequent drying to constant weight in a crucible, at the temperature of 110° C. The obtained xerogel was slowly heated up to 450° C. in the course of two hours in an oven, and maintained at this temperature until reaching constant weight. The residue consisted of $SnO_2$ in form of cassiterite and the thermal decomposition yield resulted equal to 76%.

The thus prepared stannic hydroxychloride solution results completely miscible with iridium or ruthenium chloride solutions. The homogeneity of oxide coatings obtained with this method was verified during the different thermal treatment by microscope observations.

EXAMPLE 2

One liter of the stannic hydroxychloride solution of example 1 was modified by addition of about 50 g of metallic tin powder, in order to alter the Cl:Sn ratio. The metal began to dissolve while stirring, and after a few hours the formation of hydroxide, recognisable for its cloudy appearance, was observed. The solution was then decanted and added with 30% hydrogen peroxide until a redox potential of 0.5-0.6 V SSCE was reached and the turbidity disappeared. The solution was then brought to volume with water to obtain a concentration of 1.65 M in Sn(IV) and a density of 1.31 g/ml. A hydroxychloride of formula $Sn(OH)_{2.15}Cl_{1.85}.nH_2O$ was thus obtained, which provided a film of $SnO_2$ according to the sol-gel method of example 1 with a yield of 81.5%.

EXAMPLE 3

A solution of Sn (IV) HAC (stannic hydroxyacetochloride, $Sn(OH)_2Ac_{2-x}Cl_x$) was prepared at a concentration of 1.65 M tin corresponding to 195 g/l. For this purpose, 200 g of $SnCl_2.2H_2O$ were dissolved in 500 ml of water, subsequently adding 200 ml acetic acid and 100 g of metallic tin powder. 30% hydrogen peroxide was slowly added to the mixture under thermostatted conditions, until detecting the cease of heat emission and the reaching of a potential of 0.6 V SSCE. The mixture was maintained for 3 days at room temperature saturating again with metallic tin, then a new addition of hydrogen peroxide was carried out up to a potential of 0.6 V SSCE. The solution obtained, of a pale yellow colour and opalescent aspect, was decanted and brought to a density of 1.28 g/ml with water, corresponding to a concentration of 1.65 M tin equivalent to 195 g/l, and the subsequent elementary analysis evidenced a Cl:Sn ratio equal to 1.20. The yield in SnO2 after pyrolysis, measured as in the previous examples, resulted to be 96%. This value resulted to be reproducible in a second test on a sample of the same solution stored for more than one year, whose extreme stability was hence demonstrated.

EXAMPLE 4

The solution of example 3 was used for the deposition of a mixed oxide coating of composition $IrO_2.2SnO_2$. A 2 mm thick titanium plate of 10 mm×20 mm size was sandblasted until reaching an average roughness Ra of about 40 μm and pickled in a boiling aqueous solution of caustic soda of 1.30 g/ml density for 15 minutes.

On the surface obtained, 10 ml/m$^2$ of a 2 M $TiCl_4$ hydroalcoholic solution (20% vol. ethanol in water) were applied. The coated surface was dried for 15 minutes at 120° C., then heated for 15 minutes more at 120° C. On the $TiO_2$ prelayer thus obtained, 10 ml/m$^2$ of a precursor solution prepared by mixing of equal volumes of $H_2IrCl_6$ (0.8 M) and Sn(IV) HAC (1.65 M) were applied, the latter corresponding to the solution of the previous example. The titanium plate was then dried at 120° C. and heated at 500° C. for 15 minutes. The Ir content. detected by X-ray fluorescence resulted equal to 0.80 g/m$^2$. A second coat was then applied likewise, increasing the Ir content to 1.6 g/m$^2$. The coating appeared black, smooth and shiny, showing high adhesion and hardness. No phenomenon of coating cleavage was observed in a subsequent test of mechanical deformation (bending test). An accelerated duration test was then effected according to a common practice, carried out in a 50 g/l $Na_2SO_4$ solution at a temperature of 25° C. and at a current density of 5000 A/m$^2$. During the test, the anode was periodically removed from the solution to be subjected, after rinsing and drying, to a check of the coating adhesion to the substrate. Such a check, as widely known in the art, is carried out by applying a strip of pressure sensible adhesive tape, which is then abruptly removed to evidence possible detachment phenomena. The result of these periodic checks was negative every time. The anode worked for 2250 hours before observing a potential increase of 1 V, which conventionally marks the deactivation point. The measured specific duration index was therefore 7.10$^6$ Ah/m$^2$ per gram of noble metal (Ir). This value is higher than those of the most typical anodes of the prior art, based on $IrO_2+Ta_2O_5$, as reported in J. Appl. Electrochem. 26 (1996) 999.The oxygen evolution overvoltage relative to the above disclosed anode, in 1 N $H_2SO_4$ at 25° C. resulted of 0.43 V at a current density of 10000 A/m$^2$, with a Tafel slope of 0.060 V/decade.

As it is evident to an expert in the field, the invention may be practised making variations of modifications to the conditions of the cited examples. For the sake of exemplifying, the pyrolytic treatments carried out by the inventors at 500° C. may be alternatively effected at temperatures comprised between 350 and 800° C., depending on the effective industrial application and the particular selected precursors. Likewise, the steps of low temperature drying of the electrodes can obviously be carried out at different temperatures, preferably comprised between 80 and 200° C.

It is therefore to be understood that the foregoing description does not wish to limit the invention, which may be employed according to different embodiments without departing from the scopes thereof, and whose extent is univocally defined by the appended claims.

In the description and claims of the present application, the word "comprise" and its variations such as "comprising" and "comprises" are not intended as excluding the presence of other elements or additional components.

The invention claimed is:

1. A method for the manufacturing of a precursor solution for the pyrolytic formation of a tin-containing coating comprising adding hydrogen peroxide to a stannous chloride solution, optionally under temperature and redox potential control, to form a solution of stannic hydroxychloride.

2. The method of claim 1 wherein the Cl:Sn ratio in the solution is decreased by subsequent reduction of metallic tin and further addition of hydrogen peroxide, optionally under temperature and redox potential control.

3. The method of claim 1 wherein said stannous chloride solution further contains a precursor of an organic substituent.

4. The method of claim 3 wherein said precursor of an organic substituent is acetic acid.

* * * * *